United States Patent [19]

Walker et al.

[11] 3,722,321
[45] Mar. 27, 1973

[54] METHOD AND APPARATUS FOR TRANSMISSION BREATHING

[75] Inventors: Frank H. Walker; Richard W. Craig, both of Grand Blanc, Mich.

[73] Assignee: General Motors Corporation, Detroit, Mich.

[22] Filed: Oct. 27, 1971

[21] Appl. No.: 193,111

[52] U.S. Cl. .................................................74/606 R
[51] Int. Cl. ..............................................F16h 57/04
[58] Field of Search .............................74/606 R, 763

[56] References Cited

UNITED STATES PATENTS

| 3,541,887 | 11/1970 | Van Lent et al. | 74/763 |
| 3,686,973 | 8/1972 | Davison, Jr. et al. | 74/606 R |

Primary Examiner—Charles J. Myhre
Assistant Examiner—F. D. Shoemaker
Attorney—W. E. Finken et al.

[57] ABSTRACT

The transmission housing extension contains an expansible and contractable breather bag with the interior of the bag vented to atmosphere to provide a completely sealed breather system thereby providing for the substantial reduction in oxidation of the transmission lubricant. When transmission operating conditions cause the gas inside the transmission to expand, the breather bag is forced to contract and increase the volume inside of the transmission case to accommodate the expansion. When operating conditions are such that the gas within the transmission case contracts, atmospheric pressure will cause the breather bag to expand. Relief valves are provided for the breather bag to prevent the buildup of excessive positive or negative pressures within the transmission.

7 Claims, 4 Drawing Figures

PATENTED MAR 27 1973 3,722,321
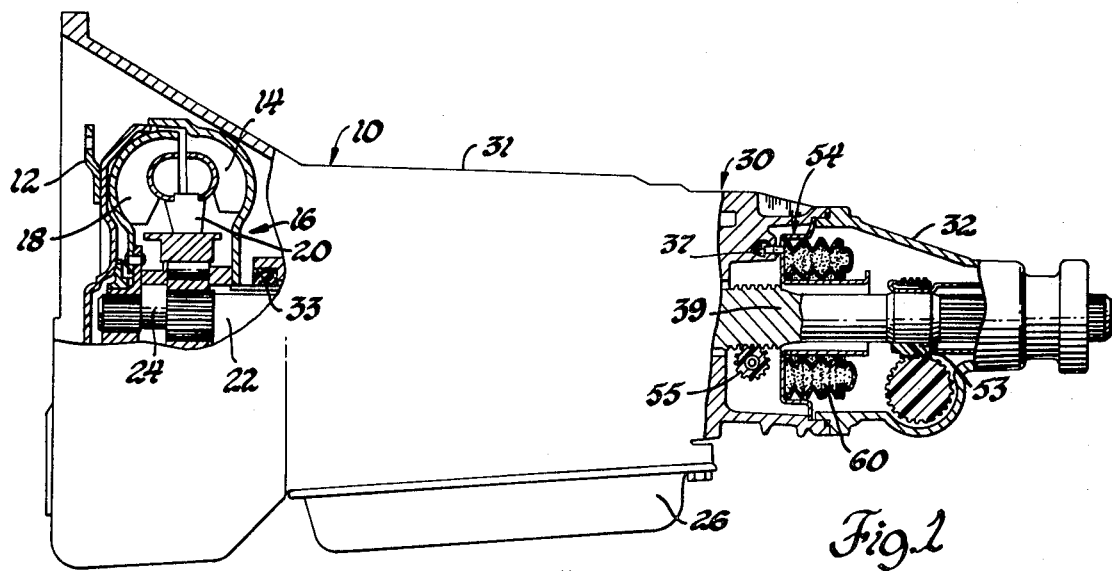
Fig.1
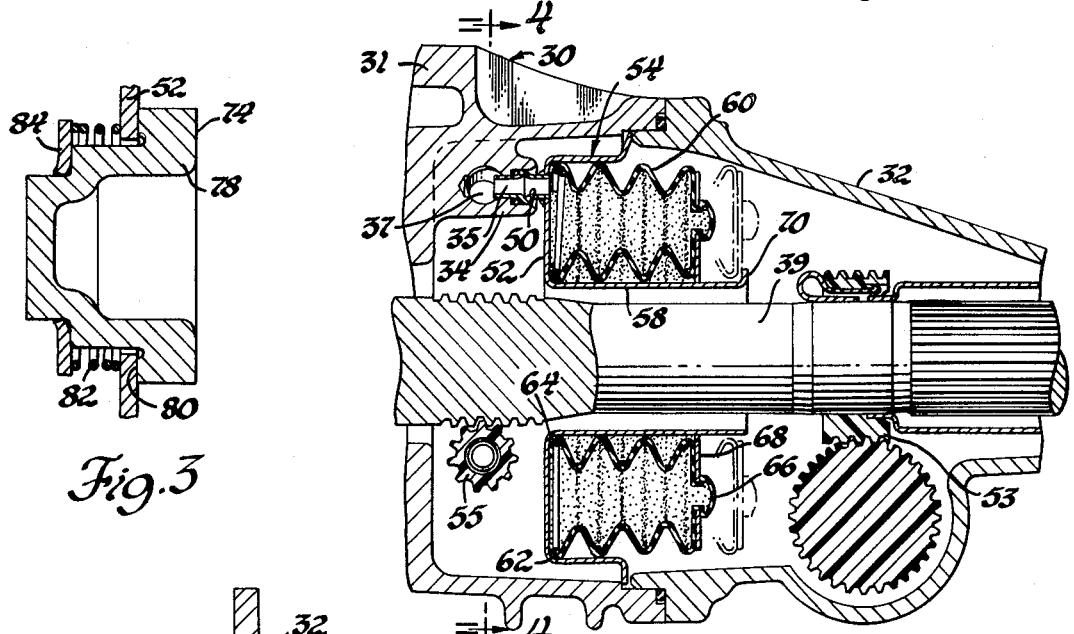
Fig.3
Fig.2
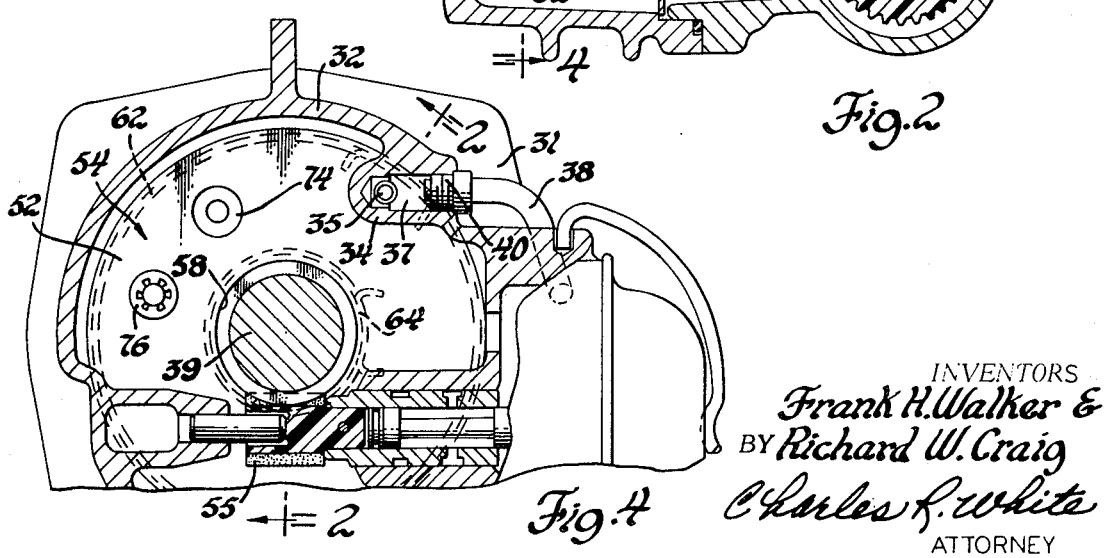
Fig.4
INVENTORS
Frank H. Walker &
BY Richard W. Craig
Charles R. White
ATTORNEY checking transmission oil level may be employed with this invention; however, it must be provided with appropriate seal means to prevent the entrance or exit of air or gas into or out of the transmission.

As best shown by FIG. 4 the end wall 34 of housing 31 has a breather passage 35 formed therein with an interior opening above the level of the lubricant fill and which communicates with passage 37 that leads through the side of housing 31. A breather tube 38 having one end open to the atmosphere is secured in passage 37 by a threaded connector 40. The end of tube 38, which is open to the atmosphere, is shown in phantom lines in FIG. 4 since it is hidden by a portion of the extension housing containing the governor assembly. Passage 35 has a short pipe 50 located therein which extends through a wall 52 of an annular support 54 shaped somewhat like a torus which is located inside of the housing extension 32. This extension housing contains conventional speedometer and governor valve drive gears 53 and 55 and is bolted or otherwise secured to the end wall 34 of housing 31. The output shaft 39 extends through the extension housing being sealed at its exit point by a rear seal not shown.

The support 54 has a central tubular or sleeve-like portion 58 through which output shaft 39 extends. Mounted in support 54 is an annular convoluted breather bag or bellows 60 preferably of neoprene or other suitable resilient material having long service life in transmission oil. The interior of this breather bag is open to the atmosphere through pipe 50, passage 37 and breather tube 38.

As best shown in FIG. 2, one end of the breather bag 60 is fixed in position by an outer wire clamp 62 which expands to tightly hold the first outer convolution of the bag 60 against the confining walls of support 54 and by a wire inner clamp 64 which contracts to hold the first interior convolution tightly against the tubular portion 58 of the support 54. The free end of the bag is formed with button-like projections 66 which are inserted through suitable holes in an annular end plate 68 which contact an upturned lip 70 formed on the end of tubular portion 58 to limit the longitudinal movement of the air bag as the transmission lubricant temperatures decrease to establish a negative pressure in case 30.

This invention preferably has relief valves 74 and 76 to allow one-way flow of gas under predetermined operating conditions to prevent the over or under pressurization of the transmission. As best shown in FIG. 3, valve 74 is an exhaust valve having a valve body 78 disposed in an opening in the wall 52 of the support 54 and has an annular sealing lip 80 that contacts the interior surface of wall 52 under the force of coil spring 82 disposed between the outer surface of wall 52 and a friction clip 84 installed on an annular shoulder of the valve body. When a predetermined positive pressure occurs in the transmission, the breather bag 60 will be collapsed to provide room for the displacement and expansion of gas inside of casing 30. At even higher pressures the valve body 78 will be forced inwardly by internal pressure when the force exerted thereon is sufficient to overcome spring 82 to open a passage through a seal to the atmosphere through the interior of the bag 60.

Valve 76 is similar to valve 74 but is turned around so that a predetermining negative pressure occuring in the transmission housing will allow atmospheric pressure in the breather bag to move the valve body to move outwardly against the force of its associated spring to break the seal of thereby open the interior of the transmission to atmosphere to reduce the vacuum. This reduction in vacuum occurs after the bag has expanded to the phantom line position shown in FIG. 2.

In operation and when the transmission is cold the pressure inside of the transmission is low and bag 60 is in the expanded position shown with both relief valves closed. As the transmission is operated, the lubricant and gas inside of the transmission expands. The gas exerts a force on the bag 60 which moves to a collapsed position to increase the volume within the transmission available for the gas, 64 cubic in. for example. If there is further increase in pressure inside case 30 the valve 74 will subsequently open to exhaust gas to the atmosphere. If during operation the temperature in the sump reduces, the gas and transmission lubricant contracts providing a vacuum so that atmospheric pressure again expands the bag to its phantom line position. If the vacuum increases the valve 76 will open to allow air to enter into the transmission case and relieve the high vacuum conditions.

As pointed out above the oxidation of the transmission lubricant is substantially reduced since it is effectively a closed system and any oxygen therein is quickly oxidized. In the event of high vacuum conditions relief valve 76 will admit air to protect the seals such as front seal 33 but this valve quickly closes as soon as the high vacuum conditions have been reduced so that only limited amounts of oxygen are allowed into the case.

Although a preferred embodiment of the invention has been shown and described other embodiments will be apparent to those skilled in the art. Thus, this invention is not to be limited to the particular embodiment shown and described but by the following claims.

We claim:

1. A sealed breather system for a power transmission having a transmission input, power transmission means operatively connected to said input, transmission output means operatively connected to said power transmission means, a pneumatically sealed casing for said power transmission surrounding said power transmission means and having an end partition through which said transmission output extends, a lubricant in said casing for lubricating said power transmission means, a housing extension secured to said housing adjacent to said end partition, a flexible and airtight container mounted in said extension, breather passage means operatively connecting the interior of said container with the atmosphere outside of said transmission so that positive pressure buildup within said casing will act on said container to reduce the volume thereof to thereby increase the space within said casing for gas expansion and so that said container will expand in response to the force of atmospheric pressure therein when a negative pressure occurs in said transmission.

2. In a transmission, transmission input and output means, power transmission means operatively connecting said input and output means, a casing having a gas therein, a liquid lubrication fill in said casing which partially fills said casing and which is subject to oxidation,

METHOD AND APPARATUS FOR TRANSMISSION BREATHING

This invention relates to transmissions and more particularly to a new and improved transmission breathing method and apparatus for limiting the oxidation of the transmission lubricant.

In prior transmission devices, such as a conventional torque converter transmission, air is allowed to flow freely into and out of the transmission case or housing through an air vent or breather tube during transmission operation. Such breathing provision prevents the occurrence of positive or negative pressures in the transmission to thereby ensure that excessive forces are not applied to the seals to cause them to leak the lubricant. When temperatures in the case increase during operation, the lubricant and the air inside of the case expand and the air flows freely out of the breather tube into the atmosphere. When the temperatures in the transmission decrease, the lubricant contracts and air from the atmosphere is allowed to flow freely into the transmission case. During such transmission breathing the air taken into the transmission readily mixes with the transmission lubricants to cause undesired oxidation of the lubricant thereby shortening its service life as well as that of the transmission. At higher lubricant temperatures and during faster rates of breathing the oxidation of the liquid lubricant is accelerated.

Prior to the present invention chemical oxidation inhibitors have been employed with considerable success to reduce the rate of lubricant oxidation thereby extending the lubricant service life and lengthening the time between transmission lubricant changes. However, these additives have increased the cost of the lubricant and are themselves subject to decomposition after limited periods of use which adversely affects their subsequent performance.

In this invention, oxidation of the transmission lubricant is substantially reduced by having a completely sealed breathing apparatus comprising a breather bag or bellows pneumatically connected with a breather passage through the transmission case. The breather bag contracts to provide the additional volume to permit the gas inside of the transmission case to expand. This bag expands under the force of atmospheric pressure when the gas within the transmission contracts. This sealed breathing unit reduces transmission lubricant oxidation since any oxygen in the transmission case is soon oxidized with the liquid lubricant and no further oxidation can take place. Preferably in this invention the breather bag is located in a convenient place within the housing of the device such as in the transmission extension housing. However, it is contemplated that the breather bag or similar container may be located within or adjacent to other parts of the transmission.

It is a feature and object of this invention to provide a new and improved method and apparatus for transmission breathing to reduce the oxidation of the lubricant within the transmission and thereby extend the useful life of the lubricant and the transmission.

Another feature and object of this invention is to provide a new and improved breather system for a transmission in which a flexible breather bag is operatively connected to a breather passage through the transmission case which collapses in response to the expansion of the lubricant within the case to make room for the expansion of gas therein and which bag is expanded by atmospheric pressure when the lubricant and gas in the case sufficiently cools and contracts.

Another feature and object of this invention is to provide a new and improved breather apparatus for a transmission in which a breather bag is operatively disposed inside of the housing extension and the interior of the bag is vented to atmosphere so that: (1) increased volume for gas expansion is obtained by the folding or collapsed of the bag to an exhausted position when the transmission lubricant temperature sufficiently rises during operation and (2) the breather bag expands under the force exerted by atmospheric pressure when the transmission lubricant temperature sufficiently decreases and a vacuum condition exists within the transmission.

Another feature and object of this invention is to provide a new and improved method of transmission breathing in which increased space is made available to allow for the expansion or displacement of gas within the transmission case when the lubricant therein is sufficiently heated and for opening of the interior of the case to atmosphere after a predetermined pressure has been obtained therein; and in which there is decreased space for the gas in the transmission case when the lubricant therein is sufficiently cooled until a predetermined vacuum is obtained and the case is opened to atmosphere.

These and other features, objects and advantages of the invention will become more apparent from the following detailed description and drawing in which:

FIG. 1 is a side elevational view, partly in cross section, of a transmission;

FIG. 2 is a view of an end portion of the transmission of FIG. 1, taken along lines 2—2 of FIG. 4;

FIG. 3 is an enlarged cross-sectional view of a valve used in this invention;

FIG. 4 is a view taken along lines 4—4 of FIG. 2.

As shown in FIG. 1, there is a transmission 10 having an input member 12 for rotatably driving a bladed pump element 14 of a hydrodynamic torque converter 16. The torque converter also has a rotatable bladed turbine element 18 and a bladed stator element 20. The stator element is operatively connected to a ground sleeve 22 by a one-way clutch while the turbine element 18 is drivingly connected to a rotatable torque transmitting shaft 24 which drives the input gear means of a change-speed gear unit employed in the transmission for changing transmission input/output speed ratios. A suitable gear unit which may be employed with this invention is disclosed in U.S. Pat. No. 3,541,887, filed Mar. 28, 1969 by Van Lent et al.

The transmission of this invention has a lubricant circulating pump operatively connected to the converter pump element 14 preferably of the internal-external gear type for pumping the lubricant from a sump 26 at required pressures for lubrication and for operation of the transmission and controls. The transmission components including the gearing are contained and completely sealed within the transmission casing 30 comprising primary housing 31 and extension housing 32 connected thereto. Suitable seals for the casing such as annular front seal 33 are provided so that air or gas cannot freely enter into or exhaust from the transmission. A filler tube providing a conduit for feeding and a transmission breather passage open to the atmosphere and extending completely through the wall of said casing and terminating above the normal level of the fill therein, said casing having an extension secured at one end thereto through which said transmission output means extends, a support disposed within the confines of said extension, a flexible airtight reservoir disposed on said support, and breather passage means operatively connecting the interior of said reservoir with said breather passage so that expansion of said fill and said gases will cause said reservoir to contract from a first position and expel air contained therein to said atmosphere thereby increasing the effective volume of said casing and decreasing the rate of pressure rise within said casing and so that contraction of said fill and said gases causes a vacuum that allows atmospheric pressure to expand said reservoir to said first position.

3. In a breather system for a transmission to reduce the oxidation of the lubricants therein, a sealed casing, a breather passage in said casing through which a controlled amount of gas is taken into and exhausted from the interior of the casing, a transmission breather container for said casing operatively connected to said breather passage, said container having an expansible and collapsible interior chamber, passage means operatively connecting said interior chamber of said container to atmosphere whereby said chamber contracts in response to a positive pressure occurring in said casing to provide for the expansion of gas therein and whereby said chamber expands in response to a negative pressure occurring in said casing.

4. The breather system defined in claim 3 and further including relief valve means operatively connected to said container which opens in response to the establishment of a predetermined positive pressure in said transmission casing to open all portions of the interior of the casing to the atmosphere to relieve the pressure therein and which opens all portions in the interior of the casing to atmosphere in response to the establishment of a predetermined negative pressure in the casing to reduce the vacuum therein.

5. In a breather system for a transmission having a sealed casing with a liquid lubricant therein and a gas above said lubricant, a breather passage formed completely through the wall of said casing which connects the interior of said casing with the atmosphere, a resilient breather bag disposed in said casing for sealing a major portion of the interior of said casing from communication with the atmosphere, said breather bag having a passage to the interior thereof which is pneumatically connected to said breather passage whereby a predetermined positive pressure occurring within said casing will deflate said breather bag to exhaust air therefrom to the atmosphere to provide additional space for expansion of said gas and whereby said breather bag expands in response to the establishment of a negative pressure within said casing.

6. The transmission breather system defined in claim 5, a support for said breather bag within said casing, said breather bag being a bellows having an open end portion, first and second clamp means for clamping said open end portion to one end of said support to provide a pneumatic seal between said bellows and said support, said support having an opening therein leading to the interior of said bellows, and pipe means pneumatically connecting said opening to said breather passage.

7. A method of controlling transmission breathing comprising the steps of: pneumatically connecting a breather bag to a breather passage in a pneumatically sealed transmission casing; opening the interior of said breather bag to the atmosphere; operating the transmission so that a positive pressure builds up inside of the transmission casing to collapse said bag and force the air inside said bag to the atmosphere; opening a pressure relief valve in response to a further increase in pressure inside of said transmission casing so that some of the gas inside of said transmission casing can escape into the atmosphere until a lower positive pressure is obtained; expanding said breather bag by the reduction of pressure inside of said transmission casing to a negative pressure; opening a pressure relief valve to connect the interior of said transmission casing to atmosphere in response to an increase in vacuum inside of said transmission casing to reduce said vacuum.

* * * * *